United States Patent
Chen (10) Patent No.: US 12,395,918 B2
(45) Date of Patent: Aug. 19, 2025

(54) UPLINK ROUTE DECISION METHOD, DISTRIBUTED UNIT DEVICE AND USER PLANE FUNCTION CONNECTING METHOD IN MOBILE COMMUNICATION SYSTEM

(71) Applicant: Wistron Corporation, New Taipei (TW)

(72) Inventor: Chih-Ming Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 596 days.

(21) Appl. No.: 17/939,999

(22) Filed: Sep. 8, 2022

(65) Prior Publication Data

US 2023/0319674 A1    Oct. 5, 2023

(30) Foreign Application Priority Data

Mar. 30, 2022    (TW) .................................. 111112240

(51) Int. Cl.
*H04W 40/02*    (2009.01)
*H04W 76/10*    (2018.01)

(52) U.S. Cl.
CPC ........... *H04W 40/02* (2013.01); *H04W 76/10* (2018.02)

(58) Field of Classification Search
CPC .............................. H04W 40/02; H04W 76/10
USPC ........................................................ 370/329
See application file for complete search history.

(56) References Cited

U.S. PATENT DOCUMENTS

| | | |
|---|---|---|
| 2019/0372929 A1 | 12/2019 | Yang |
| 2020/0120446 A1 | 4/2020 | Stammers |
| 2021/0243826 A1 | 8/2021 | Hoffmann |
| 2021/0256406 A1 | 8/2021 | Mueller |
| 2022/0014963 A1 | 1/2022 | Yeh |
| 2022/0255858 A1 | 8/2022 | Dutta |

FOREIGN PATENT DOCUMENTS

| | | |
|---|---|---|
| CN | 111327529 A | 6/2020 |
| JP | 2022-120845 A | 8/2022 |
| WO | 2020/190180 A1 | 9/2020 |
| WO | 2021/262045 A1 | 12/2021 |

*Primary Examiner* — Angel T Brockman
(74) *Attorney, Agent, or Firm* — Winston Hsu (57) ABSTRACT

An uplink route decision method for a mobile communication system, wherein the mobile communication system determines an uplink path of a user equipment (UE) in the mobile communication system, includes obtaining an attribute of a user plane function (UPF) required by the UE, and determining whether the UPF is located in a local or a remote place according to an artificial intelligence model.

30 Claims, 5 Drawing Sheets

UPLINK ROUTE DECISION METHOD, DISTRIBUTED UNIT DEVICE AND USER PLANE FUNCTION CONNECTING METHOD IN MOBILE COMMUNICATION SYSTEM

BACKGROUND OF THE INVENTION

1. Field of the Invention

The present invention relates to an uplink route decision method, a distributed unit device and a user plane function connecting method in a mobile communication system, and more particularly, to an uplink route decision method, a distributed unit device and a user-plane function connecting method applicable to cell-site computing in a mobile communication system.

2. Description of the Prior Art

The 5$^{th}$ generation mobile communication system (5G) is a new generation of the mobile communication technology and a successor of the fourth generation mobile communication technology (4G), which aims to achieve higher transmission rates, lower latency, larger capacity, lower costs, and more energy savings. Therefore, International Telecommunication Union (ITU) has defined three main application areas of 5G, namely enhanced mobile broadband (eMBB), ultra-reliable and low latency communications (uRLLC) and massive machine type communications (mMTC).

To meet the requirement of millisecond-level latency in 5G networks, a scheme of control and user plane separation (CUPS) is introduced into 5G core network. CUPS enables the user plane function (UPF) to be flexibly deployed in the core network or in the edge site of the mobile communication system, and also enables network services such as computing and storage to sink into the edge site which is much closer to the user end so as to realize mobile edge computing (MEC).

The radio signals sent from the user equipment are received by a radio unit (RU), and then transmitted to the core network through a distributed unit (DU) and a central unit (CU) to access an external data network (DN), which is, however, a process of accumulating delays. Moreover, the distance between the DU site and the CU site in this architecture may be up to 100 kilometers away, and the latency caused by the distance cannot meet the requirements of real-time applications. In this situation, even if the 5G network provides mobile edge computing at the CU site to get close to the user site, the network transmission is still limited by the distance between the DU site and the CU site and therefore causes unsatisfactory delays.

SUMMARY OF THE INVENTION

Therefore, the present invention is to provide an uplink route decision method, a distributed unit device and a user-plane function connecting method in a mobile communication system, which further sinks the computing function into the cell sites, so as to reduce latency.

An embodiment of the present invention discloses an uplink route decision method for a mobile communication system, wherein the mobile communication system determines an uplink path of a user equipment (UE) in the mobile communication system. The uplink route decision method comprises obtaining an attribute of a user plane function (UPF) required by the UE, and determining the UPF is located in a local or a remote place according to an artificial intelligence (AI) model.

An embodiment of the present invention discloses a user plane function (UPF) connecting method for a distributed unit (DU) device of a mobile communication system. The UPF connecting method comprising: receiving information obtained from a central unit (CU) of the mobile communication system, wherein the information is related to an uplink route decision method and the uplink route decision method is used to determine an uplink path of a user equipment (UE) in the mobile communication system, comprising: obtaining an attribute of a UPF required by the UE, and determining whether the UPF is located in a local or a remote place according to an artificial intelligence (AI) model; and establishing a connection with a first user plane unit or a second user plane unit according to the information.

An embodiment of the present invention discloses a distributed unit (DU) device for a mobile communication system. The DU device comprising: a process unit, configured to execute a program code; and a storage unit, coupled to the processing unit to store the program code, wherein the program code is configured to instruct the processing unit to execute a user plane function (UPF) connecting method, the UPF connecting method comprises: receiving information obtained from a central unit (CU) of the mobile communication system, wherein the information is related to an uplink route decision method and the uplink route decision method is used to determine an uplink path of a user equipment (UE) in the mobile communication system, comprising: obtaining an attribute of a UPF required by the UE, and determining whether the UPF is located in a local or a remote place according to an artificial intelligence (AI) model; and establishing a connection with a first user plane unit or a second user plane unit according to the information.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
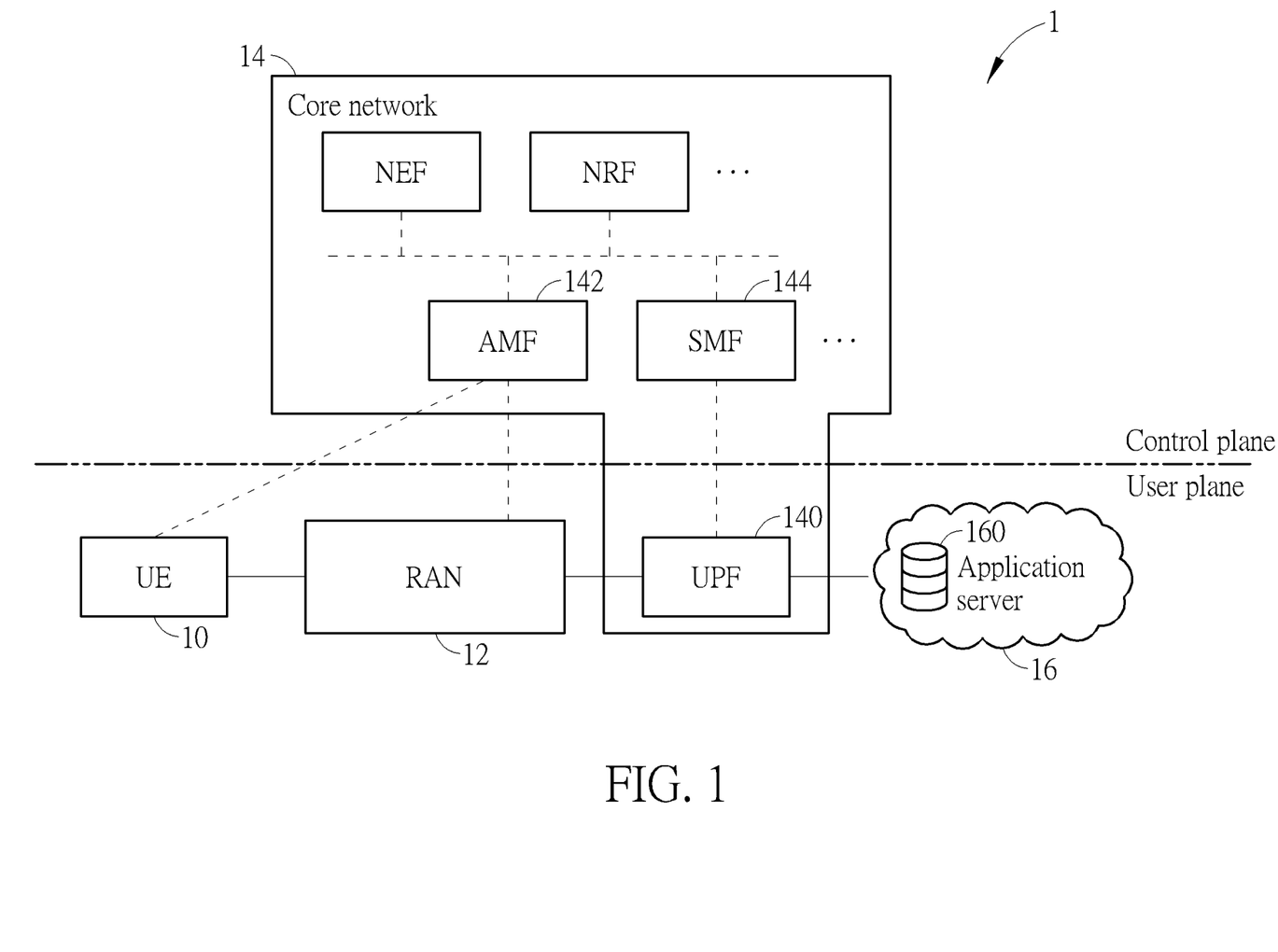
FIG. 1 is a schematic diagram of a 5G mobile communication system.

Please refer to FIG. 1, which is a schematic diagram of a mobile communication system 1. The mobile communication system 1 complies with 5G specifications and generally comprises a plurality of user equipments (UEs) 10, a radio access network (RAN) 12, a core network 14, and an external data network 16. The core network 14 comprises an Access and Mobility Management Function (AMF) 142, a Session Management Function (SMF) 144, etc. belonging to a control plane and a User Plane Function (UPF) belonging to a user plane. For the sake of simplicity, FIG. 1 only shows a UE 10 and the required core network functions as a representative, where links belonging to the control plane are shown with dashed lines, and links belonging to the user plane are shown with solid lines. Generally speaking, when the UE 10 needs to access an application server 160 located in the external data network 16, the UE 10 has to register to the core network 14 through the AMF 142 first, and the UPF 140 selected by the SMF 144 forwards the user data of the UE 10 through the RAN 12, so as to connect to the application server 160 for further access. This process would accumulate a huge amount of latency, which may not satisfy the applications that require extremely low delays such as industrial automation, autonomous cars, etc. Therefore, 5G-related industries have introduced mobile edge computing to the RAN 12 under the premise of Control and User Plane Separation (CUPS), so as to be close to the user site. However, in the 5G architecture, the RAN 12 includes RUs, DUs, and CUs, etc., and the mobile edge computing defined in the CUs may still be burdened by the distance between the DU site and the CU site, which results in additional or undesirable delays.

Figure 3:
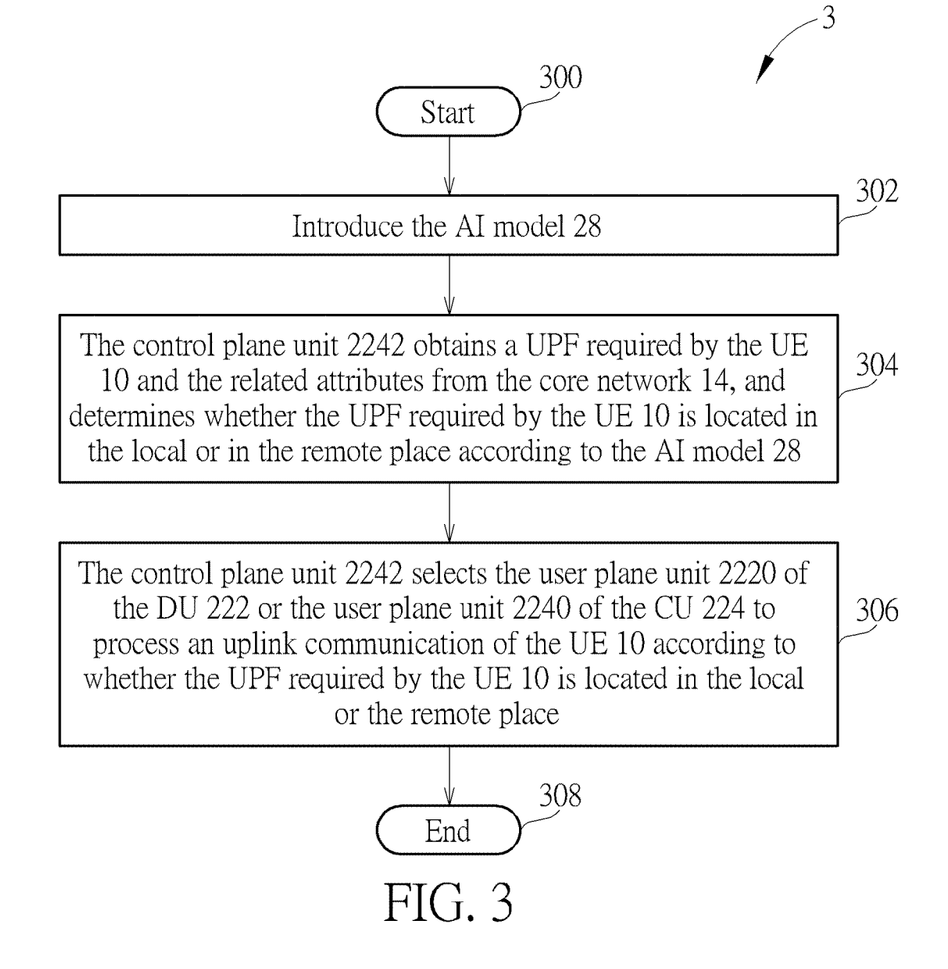
FIG. 3 is a schematic diagram of a process for determining an uplink path according to an embodiment of the present invention.

In order to further reduce the latency, the present invention further sinks the network computing function to the cell sites, i.e. the DUs, and provides a corresponding transmission path selection mechanism accordingly. Please refer to FIG. 2, which is a schematic diagram of a RAN 22 with cell-site computing according to an embodiment of the present invention. The RAN 22 may replace the RAN 12 shown in FIG. 1, such that the plurality of UEs 10 (only one of which is shown as a representative) may access an application server 27 in a remote place through a remote UPF 25 or an application server 26 in the local place through a local UPF 24. In detail, the RAN 22 comprises an RU 220, a DU 222 and a CU 224. The CU 224 may be divided into a control plane (i.e., Central Unit Control Plane, CU-CP) unit 2242 that processes protocols related to the control plane, such as Radio Resource Control (RRC), Packet Data Convergence Protocol (PDCP), etc., and a user plane (i.e., Central Unit User Plane, CU-UP) unit 2240 that processes protocols related to the user plane, such as Service Data Adaptation Protocol (SDAP), PDCP, etc. Note that, for the purpose of accessing the local application server 26 located at the cell site to reduce the latency, the DU 222 also comprises a user plane (CU-UP) unit 2220 which is similar to the user plane unit 2240 of the CU 224. As a result, the user plane unit 2220 may choose to avoid the traditional communication path that the user data must be sent through the CU 224, and directly forward the user data to the local application server 26 through the local UPF 24 at the DU 222 which is located in the local. It should be noted that the term "local" in the embodiment of the present invention refers to a cell site which provides services, and the local application server 26 and the local UPF 24 refer to services set up in the cell site such as the DU 222. On the other hand, the "remote" is beyond the cell site where the services are provided, and the remote application server 27 and the remote UPF 25 are referred to services located in the data network that must be accessed through the CU 224. In addition, the RAN 22 further connects to an artificial intelligence (AI) model 28 which may be deployed inside or outside the RAN 22, and the control plane unit 2242 may use the AI model 28 to determine the communication path of the UE 10. Accordingly, the user data of the UE 10 may be forwarded through the RU 220, the DU 222, the user plane unit 2240 and the remote UPF 25 to access the application server 27, or directly through the RU 220, the DU 222, the user plane unit 2220 of the DU 222, and the UPF 24 in the local to access the application server 26 located at the cell site according to the communication path determined by the control plane unit 2242. The method to determine the communication path may be summarized into an uplink route decision process 3 shown in FIG. 3. The uplink route decision process 3 comprises the following steps:

Step 300: Start.
Step 302: Introduce the AI model 28.
Step 304: The control plane unit 2242 obtains a UPF required by the UE 10 and the related attributes from the core network 14, and determines whether the UPF required by the UE 10 is located in the local or in the remote place according to the AI model 28.
Step 306: The control plane unit 2242 selects the user plane unit 2220 of the DU 222 or the user plane unit 2240 of the CU 224 to process an uplink communication of the UE 10 according to whether the UPF required by the UE 10 is located in the local or the remote place.
Step 308: End.

According to the uplink route decision process 3, the embodiment of the present invention introduces the AI model 28 in Step 302 so as to help to determine the type of the UPF required by the UE 10; in Step 304, the control plane unit 2242 obtains the attributes related to the UPF required by the UE 10 from the core network 14 and determines whether the UPF is located in the local or in the remote place according to the AI model 28; in Step 306, the control plane unit 2242 selects the user plane unit 2220 of the DU 222 or the user plane unit 2240 of the CU 224 to process the uplink communication of the UE 10 according to whether the UPF required by the UE 10 is located in the local or in the remote replace. Therefore, for an application requiring extremely low latency, the application server may be set up at a cell site in the local, and the user data may be directly sent to the local application server via the user plane unit 2220 of the DU 222 without going through the CU 224, such that the route of data transmission may be greatly shortened and the latency thereof may be reduced. On the other hand, for an application which does not require extremely low latency, the traditional communication path that the application server in the remote is accessed through the CU 224 may be still adopted.

Figure 2:
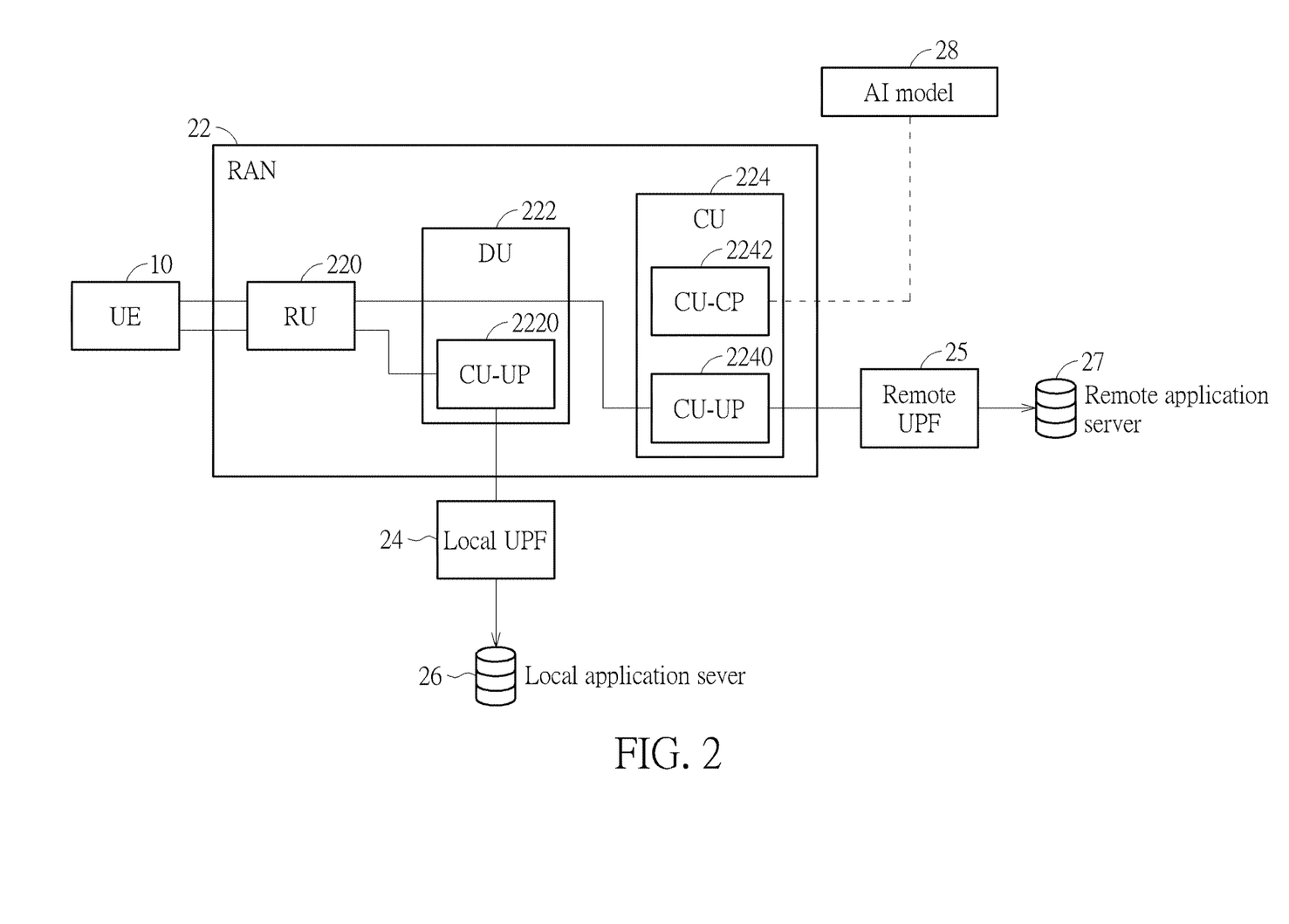
FIG. 2 is a schematic diagram of a radio access network according to an embodiment of the present invention.

In detail, the RAN 22 introduces the AI model 28 in Step 302, where the AI model 28 may be a prepared AI model which may be directly applied as a basis for subsequent steps, or a prepared AI model which is used by additional training. Furthermore, in addition to directly introducing a prepared AI model, the AI model 28 may also be trained after introduced to the control plane unit 2242. For example, the RAN 22 may use the one or more UPF attributes obtained previously and currently as training features, and continuously train the AI model 28 so as to obtain the possible relationship between the UPF attributes and the association of local or remote for subsequent determination. In an embodiment of the present invention, the AI model 28 may be a structural causal model (SCM). By a causal discovery algorithm, the AI model 28 first collects possible causal hypotheses from the relationships between one or more related UPF attributes and the associations about the local or the remote. Then, the AI model 28 may set the possible causal hypotheses in a causal diagram, and verify the hypotheses in the causal diagram by the structural causal model. At the same time, the training of the structural causal model may be completed, and the trained structural causal model may be used to determine whether the UPF is located in the local or in the remote place. In an embodiment, the attributes relevant to the UPF may include, but are not limited to, one or more of the following attributes: sNssai-UpfInfoList, smfServingArea, interfaceUpfInfoList, iwkEpsInd, pduSessionTypes, atsssCapability, uelpAddrInd, taiList, wAgfInfo, tngfInfo, twifInfo, priority, redundantGtpu, ipups, dataForwarding, etc., where the attribute names are defined in the UPF related attributes of NRF (Network Repository Function) in 3GPP TS 29.510; therefore, the definitions of the attributes will not be repeated and those skilled in the art should understand the meanings thereof.

Furthermore, the process in which the control plane unit 2242 obtains the related attributes of the UPF required by the UE 10 in Step 304 may be a process of a PDU (Protocol Data Unit) session establishment. The process is well known to those skilled in the art and is briefly described as follows. First, the UE 10 registers to the AMF 142 of the core network 14; the AMF 142 selects the SMF 144, and the SMF 144 selects the suitable UPF according to the UE 10 and the requirements thereof and returns to the AMF 142; finally, the AMF 142 returns the related attribute(s) of the UPF required by the UE 10 to the control plane unit 2242.

After the control plane unit 2242 obtains the relevant attributes of the UPF required by the UE 10, the UPF may be determined to be located in the local or in the remote place according to the aforementioned structural causal model. It should be noted that, based on the algorithm of the structural causal model, the structural causal model has the possibility of not making a decision. In this case, the embodiment of the present invention may determine whether the UPF is located in the local or in the remote place according to a default method. In an embodiment, the default method enables the control plane unit 2242 to hold a registration list about the local UPFs by registering the local UPFs to both of the core network 14 and the control plane unit 2242 at the same time while the local UPFs are published. When the structural causal model does not determine that the UPF is located in the local or in the remote place, the control plane unit 2242 may still determine that the UPF is located in the local or in the remote place based on the registration list.

Figure 4:
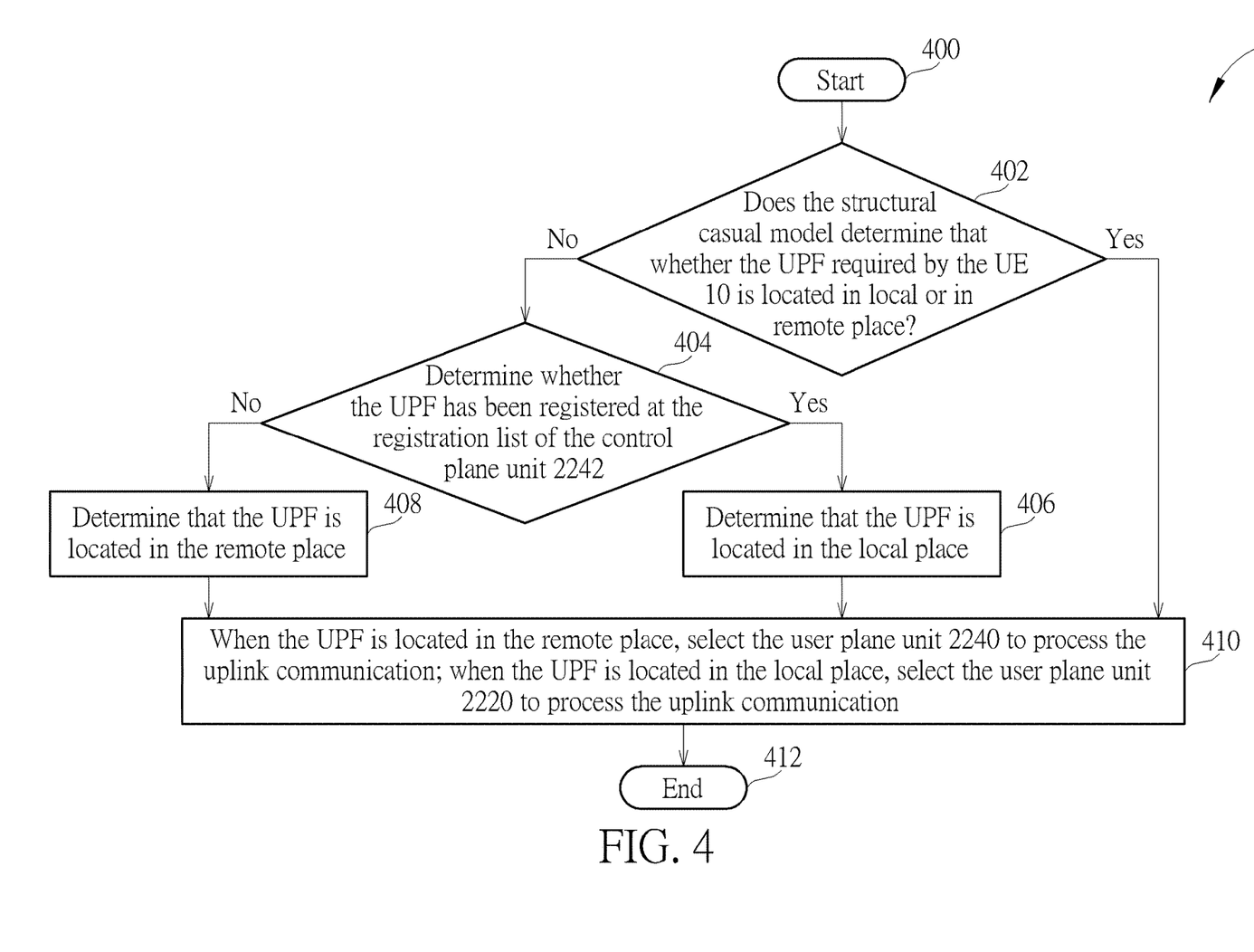
FIG. 4 is a schematic diagram of a process for selecting a user plane unit according to an embodiment of the present invention.

In detail, in Step 306, the procedure that the control plane unit 2242 selects the user plane unit 2220 of the DU 222 or the user plane unit 2240 of the CU 224 to process the uplink communication of the UE 10 according to whether the UPF required by the UE 10 is located in the local or the remote place may be summarized into a process 4 shown in FIG. 4. The process 4 comprises the following steps:

Step 400: Start.
Step 402: Does the structural casual model determine that whether the UPF required by the UE 10 is located in local or in remote place? If yes, go to Step 410; otherwise, go to Step 404.
Step 404: Determine whether the UPF has been registered at the registration list of the control plane unit 2242. If yes, go to Step 406; otherwise, go to Step 408.
Step 406: Determine that the UPF is located in the local place.
Step 408: Determine that the UPF is located in the remote place.
Step 410: When the UPF is located in the remote place, select the user plane unit 2240 to process the uplink communication; when the user plane function is located in the local place, select the user plane unit 2220 to process the uplink communication.
Step 412: End.

In brief, since the structural causal model (or the AI model 28) has the possibility of not making a decision, according to the process 4, the control plane unit 2242 first checks whether the UPF required by the UE 10 can be determined to be in the local or in the remote place according to the structural causal model in Step 402. If the structural causal model cannot determine the result, Step 404 proceeds to determine that the UPF required by the UE 10 is located in the local or in the remote place according to whether the UPF has been registered in the registration list of the control plane unit 2242 (Steps 406 and 408); otherwise, if the structural causal model determines the result correctly, the result is applied. Accordingly, in Step 410, when the UPF required by the UE 10 is located in the local place, the control plane unit 2242 selects the user plane unit 2220 of the DU 222 as a part of the data transmission path to process the uplink communication of the UE 10; when the UPF required by the UE 10 is located in the remote place, the control plane unit 2242 selects the user plane unit 2240 of the CU 224 as a part of the data transmission path to process the uplink communication of the UE 10. In addition, in an embodiment, the control plane unit 2242 may further modify a routing table of the DU 222 according to whether the UPF is located in the local or in the remote place, as a basis for establishing a connection.

After determining the uplink route path of the UE 10 according to the uplink route process 3, the core network 14 may establish the connection with the UE 10 so as to access the application server located in the local or in the remote place. More specifically, the control plane unit 2242 first establishes a connection (F1-U) between the DU 222 and the user plane unit 2220 or the user plane unit 2240 through F1-AP signaling, and then the DU 222 establishes a transmission channel accordingly. The transmission channel connects to the UPF required by the UE 10, the DU 222 transmits the information of the transmission channel to the control plane unit 2242 through the F1-AP signaling, and the control plane unit 2242 transmits the information of the transmission channel to the user plane unit 2220 or the user plane unit 2240 through E1-AP signaling. Finally, the control plane unit 2242 shares the information of the transmission channel to the core network 14 through NG-AP signaling. Accordingly, the UE 10 may be connected to the user plane unit 2220 or the user plane unit 2240 through the DU 222, and then correspondingly connected to the UPF located in the local or in the remote place so as to access the local or the remote application server.

Figure 5:
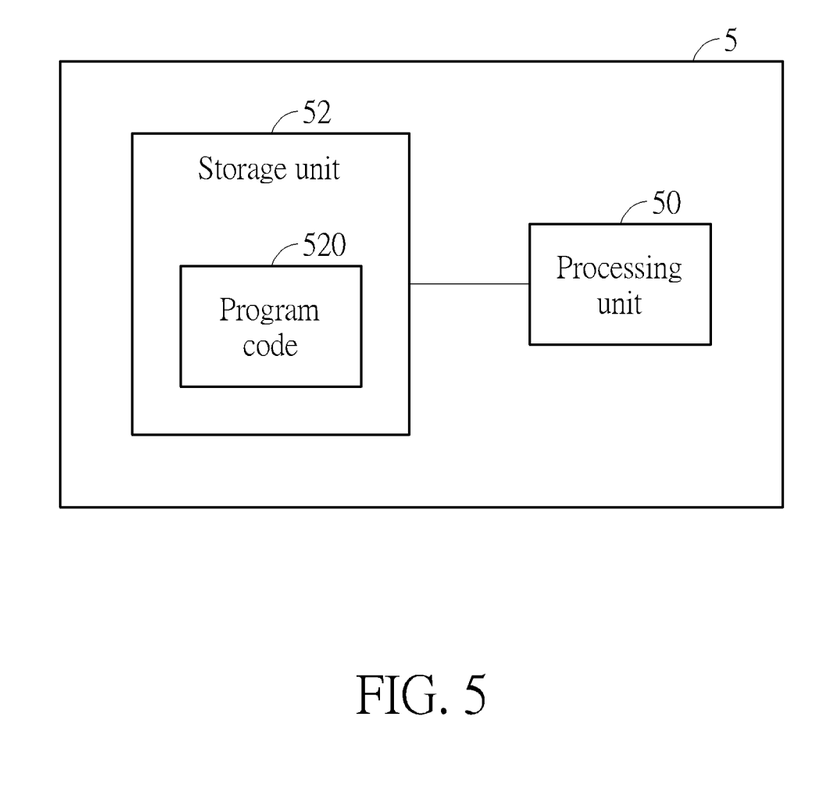
FIG. 5 is a schematic diagram of a communication device according to an embodiment of the present invention.

For implementation, please refer to FIG. 5, which is a schematic diagram of a communication device 5 according to an embodiment of the present invention. The communication device 5 may be a traditional telecommunication dedicated appliance or a general commercial off-the-shelf (COTS), which comprises a processing unit 50 and a storage unit 52. The processing unit 50 may be a microprocessor or an application-specific integrated circuit (ASIC). The storage unit 52 may be any type of data storage devices for storing a program code 520, and the program code 520 is read and executed by the processing unit 50. For example, the storage unit 52 may be a read-only memory (ROM), a flash memory, a random-access memory (RAM), a hard disk, an optical data storage device, a non-volatile storage unit, etc., and is not limited thereto.

The communication device 5 is used to represent the necessary components required to implement the embodiments of the present invention, and those skilled in the art may make various modifications and adjustments accordingly, and is not limited to this. For example, when the communication device 5 is applied to implement the CU 224, the uplink route decision process 3 may be complied into the program code 520, stored in the storage unit 52, and executed by the processing unit 50. In detail, the processing unit 50 executes Step 302 and stores the trained AI model 28 in the storage unit 52. After receiving the UE connection request from the DU 222, the processing unit 50 executes Step 304 and Step 306 and returns the routing information to the DU 222, and finally transmits the information of the transmission channel obtained from the DU 222 to the core network 14. Similarly, when the communication device 5 is applied to implement the DU 222, the DU 222 sends the UE connection request to the CU 224 and receives the routing information which is determined by the CU 224 according to the uplink route decision process 3. The processing unit 50 establishes transmission channels required by the uplink communication according to the routing information, and transmits the information of the transmission channel to the control plane unit 2242 of the CU 224.

Note that, the descriptions of the foregoing embodiments are all about processing the uplink communication of the user data, however, so does the downlink communication of the user data. The method of establishing a connection for downlink communication may be readily derived by those skilled in the art, and will not be repeated. In addition, although the above embodiments are described with the 5G, the methods and devices of the present invention are not limited thereto. The present invention may also be applied to beyond 5G as well as future $6^{th}$ generation mobile communication system (6G) to solve the problem of huge latencies caused by the distance.

In addition, the embodiment of the present invention adopts a structural causal model to implement the AI model 28 which determine whether the UPF is located in the local or in the remote place. At the same time, due to the characteristics of the structural causal model, the default method which helps to determine the UPF when the structural causal model does not determine is arranged, and not limited thereto. Those skilled in the art may adopt different AI models according to different requirements, and adopt suitable algorithms and training methods according to the adopted AI models.

In summary, the present invention provides a cell-site computing, shortens the transmission distance of the user data, and provides lower latency than the edge-site computing. Moreover, the user data may be kept in cell site without being forwarded through a DU, thereby greatly improving data privacy. With the uplink route decision method of the present invention, the UE may access the remote or the local application server according to the requirements, and therefore the flexibility of the 5G communication system is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An uplink route decision method for a mobile communication system, wherein the mobile communication system determines an uplink path of a user equipment (UE) in the mobile communication system, comprising:
    obtaining an attribute of a user plane function (UPF) required by the UE; and
    determining the UPF is located in a local or a remote place according to an artificial intelligence (AI) model.

2. The uplink route decision method of claim 1, further comprising selecting a first user plane unit in a distributed unit (DU) of the mobile communication system or a second user plane unit in a central unit (CU) of the mobile communication system to process uplink communication of the UE according to the UPF is located in the local or the remote place.

3. The uplink route decision method of claim 2, wherein the DU comprises an application server and the UE accesses the application server through the UPF in response to the UPF being located in the local place.

4. The uplink route decision method of claim 2, wherein the mobile communication system supports Control and User Plane Separation (CUPS).

5. The uplink route decision method of claim 2, wherein the AI model is a structural causal model (SCM) and the step of training the AI model is based on one or a plurality of UPF attributes as training features of the AI model, and the one or the plurality of UPF attributes comprise service areas of a Session Management Function (SMF) served by the UPF.

6. The uplink route decision method of claim 2, wherein the step of obtaining the attribute of the UPF required by the UE comprises:
    selecting, by an access and mobility management function (AMF) of the mobile communication system, a session management function (SMF);
    selecting, by the SMF, the UPF according to requirements of the UE, and returning the UPF to the AMF; and
    returning, by the AMF, information of the UPF to the CU.

7. The uplink route decision method of claim 2, further comprising:
    in response to the UPF being located in the local place, modifying a routing table of the DU.

8. The uplink route decision method of claim 2, further comprising:
    in response to the UPF being located in the local place, selecting the first user plane unit, wherein the first user plane unit processes the uplink communication of the UE; and
    in response to the UPF being located in the remote place, selecting the second user plane unit, wherein the second user plane unit processes the uplink communication of the UE.

9. The uplink route decision method of claim 2, wherein the CU establishes a connection between the DU and the first user plane unit or the second user plane unit by a first signaling; and
    the DU establishes a transmission channel connected to the UPF, wherein the DU transmits information of the transmission channel to the CU through the first signaling, and the CU transmits the information of the transmission channel to the first user plane unit or the second user plane unit through a second signaling.

10. The uplink route decision method of claim 9, wherein the CU shares the information of the transmission channel with a core network of the mobile communication system through a third signaling.

11. A user plane function (UPF) connecting method for a distributed unit (DU) device of a mobile communication system, the UPF connecting method comprising:
    receiving information obtained from a central unit (CU) of the mobile communication system, wherein the information is related to an uplink route decision method and the uplink route decision method is used to determine an uplink path of a user equipment (UE) in the mobile communication system, comprising:

obtaining an attribute of a UPF required by the UE, and determining whether the UPF is located in a local or a remote place according to an artificial intelligence (AI) model; and establishing a connection with a first user plane unit or a second user plane unit according to the information.

12. The UPF connecting method of claim 11, further comprising selecting the first user plane unit in the distributed unit (DU) of the mobile communication system or the second user plane unit in the central unit (CU) of the mobile communication system to process uplink communication of the UE according to the UPF is located in the local or the remote place.

13. The UPF connecting method of claim 12, wherein the DU comprises an application server and the UE accesses the application server through the UPF in response to the UPF being located in the local place.

14. The UPF connecting method of claim 12, wherein the mobile communication system supports Control and User Plane Separation (CUPS).

15. The UPF connecting method of claim 12, wherein the AI model is a structural causal model (SCM) and the step of training the AI model is based on one or a plurality of UPF attributes as training features of the AI model, and the one or the plurality of UPF attributes comprise service areas of a Session Management Function (SMF) served by the UPF.

16. The UPF connecting method of claim 12, wherein the step of obtaining the attribute of the UPF required by the UE of the uplink route decision method comprises:

selecting, by an access and mobility management function (AMF) of the mobile communication system, a session management function (SMF);

selecting, by the SMF, the UPF according to requirements of the UE, and returning the UPF to the AMF; and returning, by the AMF, information of the UPF to the CU.

17. The UPF connecting method of claim 12, wherein the uplink route decision method further comprises a default method in response to the AI model not determining that the UPF is located in the local or the remote place, wherein the default method comprises:

obtaining registration information of the CU;

determining that the UPF being located in the local place in response to the UPF has been registered in the CU; and determining that the UPF being located in the remote place in response to the UPF is not registered in the CU.

18. The UPF connecting method of claim 12, wherein the uplink route decision method further comprises:

in response to the UPF being located in the local place, modifying a routing table of the DU.

19. The UPF connecting method of claim 12, wherein the uplink route decision method further comprises:

in response to the UPF being located in the local place, selecting the first user plane unit, wherein the first user plane unit processes the uplink communication of the UE; and in response to the UPF being located in the remote place, selecting the second user plane unit, wherein the second user plane unit processes the uplink communication of the UE.

20. The UPF connecting method of claim 12, wherein the DU establishes a transmission channel connected to the UPF, wherein the DU transmits information of the transmission channel to the CU through the first signaling, and the CU transmits the information of the transmission channel to the first user plane unit or the second user plane unit through a second signaling.

21. A distributed unit (DU) device for a mobile communication system, the DU device comprising:

a process unit, executing a program code; and a storage unit, coupled to the processing unit and storing the program code, wherein the program code instructs the processing unit to execute a user plane function (UPF) connecting method, the UPF connecting method comprises:

receiving information obtained from a central unit (CU) of the mobile communication system, wherein the information is related to an uplink route decision method and the uplink route decision method determines an uplink path of a user equipment (UE) in the mobile communication system, comprising:

obtaining an attribute of a UPF required by the UE, and determining the UPF is located in a local or a remote place according to an artificial intelligence (AI) model; and establishing a connection with a first user plane unit or a second user plane unit according to the information.

22. The DU device of claim 21, wherein the UPF connecting method further comprises selecting the first user plane unit in the DU of the mobile communication system or the second user plane unit in the CU of the mobile communication system to process uplink communication of the UE according to the UPF is located in the local or the remote place.

23. The DU device of claim 22, further comprising an application server and the UE accesses the application server through the UPF in response to the UPF being located in the local place.

24. The DU device of claim 22, wherein the mobile communication system supports Control and User Plane Separation (CUPS).

25. The DU device of claim 22, wherein the AI model is a structural causal model (SCM) and the step of training the AI model is based on one or a plurality of UPF attributes as training features of the AI model, and the one or the plurality of UPF attributes comprise service areas of a Session Management Function (SMF) served by the UPF.

26. The DU device of claim 22, wherein the step of obtaining the attribute of the UPF required by the UE of the uplink route decision method comprises:

selecting, by an access and mobility management function (AMF) of the mobile communication system, a session management function (SMF);

selecting, by the SMF, the UPF according to requirements of the UE, and returning the UPF to the AMF; and returning, by the AMF, information of the UPF to the CU.

27. The DU device of claim 22, wherein the uplink route decision method further comprises determining a default method in response to the AI model does not determine that the UPF is located in the local or the remote place, wherein the default method comprises:

obtaining registration information of the CU;

determining that the UPF being located in the local place in response to the UPF has been registered in the CU; and determining that the UPF being located in the remote place in response to the UPF not being registered in the CU.

28. The DU device of claim 22, wherein the uplink route decision method further comprises:
  in response to the UPF being located in the local place, modifying a routing table of the DU.

29. The DU device of claim 22, wherein the uplink route decision method further comprises:
  in response to the UPF being located in the local place, selecting the first user plane unit to process the uplink communication of the UE; and
  in response to the UPF being located in the remote place, selecting the second user plane unit, wherein the second user plane unit processes the uplink communication of the UE.

30. The DU device of claim 22, wherein in the UPF connecting method,
  the DU establishes a transmission channel connected to the UPF, wherein the DU transmits information of the transmission channel to the CU through the first signaling, and the CU transmits the information of the transmission channel to the first user plane unit or the second user plane unit through a second signaling.

* * * * *